(12) United States Patent
Yu

(10) Patent No.: US 9,143,231 B2
(45) Date of Patent: Sep. 22, 2015

(54) METHOD AND APPARATUS FOR OPTICAL WIRELESS ARCHITECTURE

(71) Applicants: ZTE (USA) INC., Richardson, TX (US); ZTE Corporation, Shenzhen (CN)

(72) Inventor: Jianjun Yu, Princeton, NJ (US)

(73) Assignees: ZTE (USA) Inc., Richardson, TX (US); ZTE Corporation, Shenzhen (CN)

( * ) Notice: Subject to any disclaimer, the term of this patent is extended or adjusted under 35 U.S.C. 154(b) by 0 days.

(21) Appl. No.: 14/354,300

(22) PCT Filed: Oct. 24, 2012

(86) PCT No.: PCT/US2012/061655
§ 371 (c)(1),
(2) Date: Apr. 25, 2014

(87) PCT Pub. No.: WO2013/063089
PCT Pub. Date: May 2, 2013

(65) Prior Publication Data
US 2014/0301739 A1    Oct. 9, 2014

Related U.S. Application Data

(60) Provisional application No. 61/552,040, filed on Oct. 27, 2011.

(51) Int. Cl.
*H04B 10/11* (2013.01)
*H04B 10/2575* (2013.01)

(52) U.S. Cl.
CPC .......... *H04B 10/11* (2013.01); *H04B 10/25754* (2013.01)

(58) Field of Classification Search
CPC ............... H04B 10/11; H04B 10/2575; H04B 10/25752; H04B 10/25753; H04B 10/25754; H04B 10/25759
USPC .................................................. 398/115, 130
See application file for complete search history.

(56) References Cited

U.S. PATENT DOCUMENTS

2008/0279559 A1* 11/2008 Yu et al. ......................... 398/118
2010/0142955 A1*  6/2010 Yu et al. .......................... 398/72
2011/0069964 A1*  3/2011 Yu et al. ........................ 398/130

OTHER PUBLICATIONS

Chowdhury et al., "Spectrally Efficient Simultaneous Delivery of 112 Gbps Baseband Wireline and 60 GHz MM-Wave Carrying 10 Gbps Optical Wireless Signal in Radio-over-Fiber WDM-PON Access Systems", Sep. 2009, ECOC, pp. 20-24.*

* cited by examiner

*Primary Examiner* — Dalzid Singh
(74) *Attorney, Agent, or Firm* — Drinker Biddle & Reath LLP

(57) ABSTRACT

Embodiments of the present invention pertain to optical wireless architecture, and in particular to novel optical architecture to provide wireless (mm)-wave signals and symmetrical wireline service with long-reach. Certain embodiments of the invention pertain to a novel method and apparatus to provide 12.5-Gb/s wireless signals at 60-GHz millimeter (mm)-wave and 100-Gb/s symmetrical wireline service with 80 km long-reach, for example. Moreover, novel enabling techniques are employed to overcome fiber dispersion, reduce costs, and provide super-broadband and long-reach service.

32 Claims, 3 Drawing Sheets (a)

(b)

METHOD AND APPARATUS FOR OPTICAL WIRELESS ARCHITECTURE

CROSS-REFERENCE TO RELATED APPLICATIONS

This application is a national stage application (under 35 U.S.C. §371) of PCT/US2012/061655, filed Oct. 24, 2012, claiming the priority of U.S. Provisional Application No. 61/552,040, filed Oct. 27, 2011, the contents of which are incorporated herein by reference in their entirety.

FIELD OF THE INVENTION

This invention generally pertains to optical wireless architecture and in particular to novel optical architecture to provide wireless (mm)-wave signals and symmetrical wireline service with long-reach. Novel enabling techniques are employed to overcome fiber dispersion, reduce costs, and provide super-broadband and long-reach service.

BACKGROUND

Despite decades of progress in broadband access technology, the demand for emerging applications by end users continues to stress the data rates and flexible ability of existing wireless and wired broadband access solutions. See, for example, P. Odling, T. Magesacher, S. Host, P. O. Borjesson, M. Berg, and E. Areizaga, "The fourth broadband concept," IEEE Commun. Mag., vol. 47, no. 1, pp. 63-69, January 2009 and J. E. Mitchell, "Radio over fiber networks: Advances and challenges," presented at the ECOC Conf., Vienna, Austria, 2009, Paper P2.4.5.A.

On the wireline side, Ethernet networks operating at 40 Gb/s and 100 Gb/s per link for metro and long-haul area have gained tremendous momentum in technical and market viability research in recent years, and extensive development on interface specifications and standardization efforts are underway. In addition to the metro and long-haul application, another important market area is data center and high performance computing with very-short-reach (VSR) capability. A 10-Gb/s wireless data rate is expected for bridging 10-Gb/s Ethernet links for future personal computer (PC)-to-PC and server-to-server communications without cables; and provide backup and redundancy services for temporary restoration in a disaster recovery scenario.

Radio-over-fiber is considered to be a good solution to provide broadband optical wireless services, as described in Ng'oma et al., "Simple Multi-Gbps 60 GHz Radio-over-Fiber Links Employing Optical and Electrical Data Up-conversion and Feed-Forward Equalization," Proc. OFC, OWF2 (2009); C. T. Lin et al., "Ultra-high Data-rate 60 GHz Radio-over-Fiber Systems Employing Optical Frequency Multiplication and OFDM Formats," IEEE/OSA Journal of Lightwave Technology, vol. 28, No. 16, pp. 2296-2306, Aug. 15, 2010; K. I. Kitayama and R. A. Grifin, "Optical downconversion from millimeter-wave to IF-Band over 50 km long optical fiber link using an electroabsorption modulator," IEEE Photon. Technol. Lett., vol. 11, no. 2, pp. 287-289, February 1999; Z. Xu, X. Zhang, and J. Yu, "Frequency upconversion of multiple RF signals using optical carrier suppression for radio over fiber downlinks," Opt. Exp., vol. 15, no. 25, pp. 16737-16747, 2007; J. Yu, G. K. Chang, Z. Jia, et al., "Optical Millimeter Technologies and Field Demonstrations for Very High Throughput Wireless-Over-Fiber Access Systems", Journal of Lightwave Technology, Vol. 28, Issue 16, pp. 2376-2397 (2010); I. G. Insua, D. Plettemeier, and C. G. Schäffer, "Radio-over-fiber-based wireless access with 10 Gbits/s data rates" Journal of Optical Networking, Vol. 8, Issue 1, pp. 77-83 (2009); M. Weib et al., "60-GHz photonic millimeter-wave link for short- to medium-range wireless transmission up to 12.5 Gb/s," IEEE J. Lightw. Technol., vol. 26, no. 15, pp. 2424-2429, Aug. 1, 2008; and A. Chowdhury, J. Yu, H. C. Chien, M.-F. Huang, T. Wang, G.-K. Chang, "Spectrally efficient simultaneous delivery of 112 Gbps baseband wireline and 60 GHz MM-wave carrying 10 Gbps optical wireless signal in radio-over-fiber WDM-PON access systems", ECOC 2009, 4.5.1.

Recently, an access system with 60-GHz mm-wave Radio-over-fiber (RoF) carrying 10-Gb/s On/Off keying (OOK) data for short-range wireless transmission and 100-Gb/s wire-line downstream and 10-Gb/s wireline upstream has been demonstrated, as described in A. Chowdhury, J. Yu, H. C. Chien, M.-F. Huang, T. Wang, G.-K. Chang, "Spectrally efficient simultaneous delivery of 112 Gbps baseband wireline and 60 GHz MM-wave carrying 10 Gbps optical wireless signal in radio-over-fiber WDM-PON access systems", ECOC 2009, 4.5.1.

SUMMARY OF THE INVENTION

It is desirable for super-broadband access networks to provide symmetrical wireline services for both downstream and upstream links. Briefly, the present invention is directed to a novel optical wireless architecture to provide wireless mm-wave signals symmetrical wireline service with long-reach. Novel enabling techniques are employed to overcome fiber dispersion, reduce costs, and provide super-broadband and long-reach service.

In the methods and systems of the present invention, downstream data is carried using a first continuous wave lightwave of a first wavelength and a second continuous wave lightwave of a second wavelength. The first continuous wave lightwave carries wireless data and the second continuous wave lightwave carries wireline data. A third continuous wave lightwave of a third wavelength is used for generation of a mm-wave signal and as a local oscillator for coherent detection of an upstream signal. An optical filter is used to reduce crosstalk between the downstream wireline data and signals of the first wavelength and third wavelengths, and a polarization maintaining optical coupler is used to combine the first lightwave, the second lightwave, and the third lightwave, the combination of which is transmitted over a downlink fiber. A second optical filter is used to separate the mm-wave signal, the downstream signal of the first wavelength, and a local oscillator of the third wavelength and a high-speed photodiode is used to detect the first continuous wave lightwave of the first wavelength and the second continuous wave lightwave of the second wavelength. The mm-wave signal is amplified and broadcast.

Optionally, the downstream (and/or upstream) wireline data is PM-QPSK, PM-8PSK, or PM-8QAM, and the downstream wireless data is OOK or OFDM; or a frequency spacing between the first continuous wave lightwave and the third continuous wave lightwave is approximately 60 GHz and the spacing between the first continuous wave lightwave and the second continuous wave lightwave is approximately 30 GHz; or an optical interleaver after the polarization maintaining optical coupler. In further embodiment of the present invention, a self-mixing scheme is used to down-convert the broadcasted mm-wave signal or coherent detection is used.

Another aspect of the present inventions, is use of the third continuous wave lightwave to carry upstream wireline data and transmitting the upstream wireline data over an uplink fiber, wherein the upstream wireline data is coherent-detected. In certain embodiments, a second local oscillator is used, wherein the second oscillator comes from a source of the third continuous wave lightwave of the third wavelength.

BRIEF DESCRIPTION OF THE DRAWINGS

Embodiments of the present invention are illustrated by way of the accompanying drawings, in which.

DETAILED DESCRIPTION OF THE PREFERRED EMBODIMENTS

It is desirable for super-broadband access networks to provide symmetrical wireline services for both downstream and upstream links. Embodiments of the present invention demonstrate novel wireless architecture to provide these super-broadband services, and certain embodiments employ novel enabling techniques.

To overcome fiber dispersion, two free-run lasers with 60-GHz (+/−10-MHz) frequency spacing are used to generate 60-GHz optical mm-wave, where one laser carries 12.5-Gb/s baseband data, and the other laser does not carry any data. Self-mixing is used to realize stable down-conversion at the end user's side. In order to reduce costs, the same continuous wave (CW) lightwave source serves as optical millimeter (mm)-wave generation at the central station and also as local oscillator (LO) for coherent detection of upstream 100-Gb/s polarization multiplexing (PM)-QPSK signals.

Figure 1:
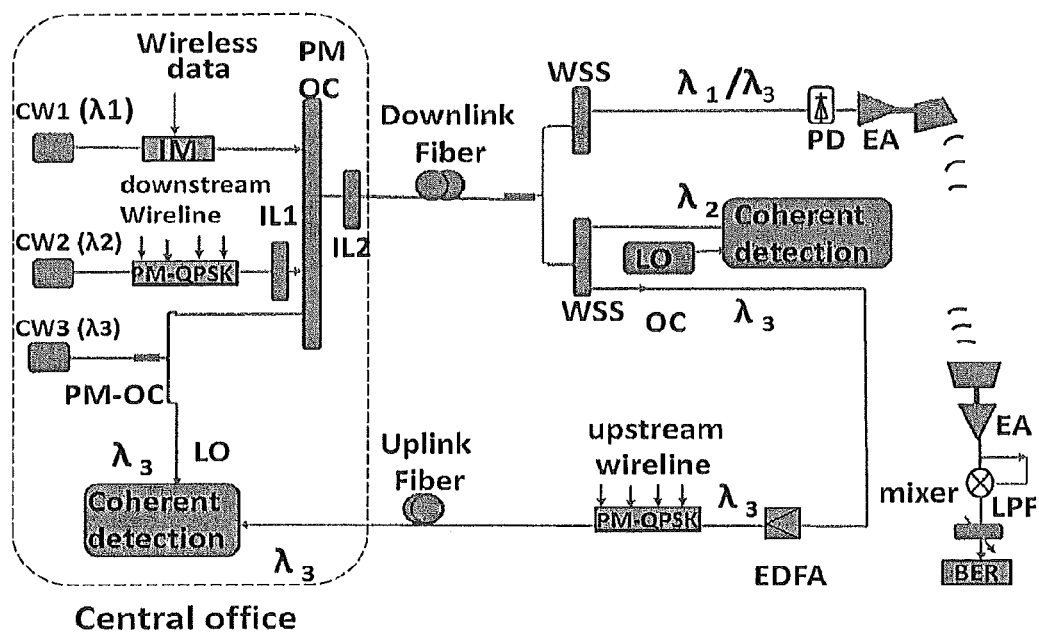
FIG. 1 illustrates architecture of a super-broadband optical wireless network.

The architecture of a super-broadband optical wireless network is shown in FIG. 1. The architecture includes one or more of the following: an interleaver (IL), a low-pass filter (LPF), an electrical amplifier (EA), a photodiode (PD), a wavelength selective switch (WSS), a polarization maintaining optical coupler (PM-OC), an intensity modulator (IM), and a local oscillator (LO).

In the central office, two CW lightwaves (CW1 and CW2) at $\lambda 1$ and $\lambda 2$ are used to carry downstream data (up to 100 Gb/s) PM-QPSK wired and wireless OOK data (up to 12.5 Gb/s), respectively. Optionally, wireless data can be in other signal formats, such as OFDM, or transmitted at other bit rates, or both. The wired data (upstream or downstream) can optionally be in other signal formats (e.g., PM-8PSK, PM-8QAM, or other modulation format), or transmitted at other bit rates (e.g., 10-Gb/s, 40-Gb/s, or other bit rate), or both.

The third free-run CW lightwave (CW3) at $\lambda 3$ is employed to provide a source for 60-GHz mm-wave generation and also as a LO for coherent detection of the upstream signal. The frequency spacing between CW1 and CW3 is 60 GHz, while the spacing between CW1 and CW2 is 30 GHz. One 30 GHz optical filter (e.g., optical interleaver, array-waveguide grating (AWG), WSS, or other optical filter) is used to remove certain spectral components of the downstream wireline data, thus reducing the crosstalk between the downstream wireline data and the signals at $\lambda 1$ and $\lambda 3$.

A polarization maintaining optical coupler (PM-OC) is used to combine the three signals at $\lambda 1$, $\lambda 2$, and $\lambda 3$. In certain embodiments, to ensure that the combined wireless and wireline signals are held in 100-GHz spacing, a 100-GHz optical interleaver is used after the PM-OC.

After transmission over the downlink fiber, an optical filter (e.g., optical interleaver, AWG, WSS or other optical filter) is used to separate the optical mm-wave signal, downstream signal at $\lambda 2$, and LO at $\lambda 3$. The two lightwaves at $\lambda 1$ and $\lambda 2$ are selected and detected by a high-speed photodiode to generate electrical mm-wave signals. After amplification and broadcasting, generated electrical mm-wave signal is detected at the end user. At the end user, a self-mixing scheme is used to down-convert the wireless signal. For the wireline downstream PM-QPSK signal, coherent detection is employed. The separated lightwave at $\lambda 3$ is also used to carry the upstream PM-QPSK wireline data (up to 100 Gb/s). After transmission over the uplink fiber, the upstream PM-QPSK wireline data is coherent-detected, and the LO comes from the same CW source at $\lambda 3$.

Figure 2:
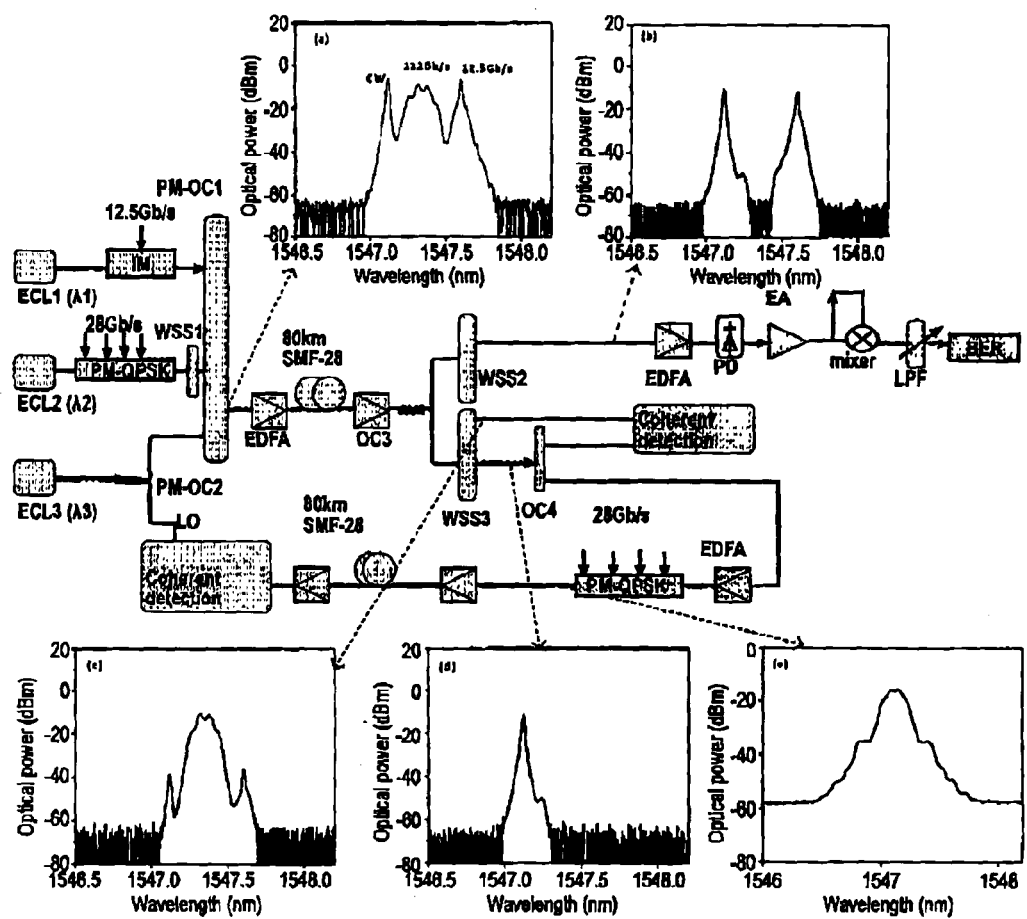
FIG. 2 illustrates architecture of a super-broadband optical wireless network and its corresponding optical spectra (experimental setup and optical spectra of architecture of super-broadband optical wireless network: (a)-(d) resolution of 0.01 nm and (e) of 0.1 nm)

An experimental setup of super-broadband and long-reach optical wireless access network is shown in FIG. 2. The architecture includes one or more of the following: an external cavity laser (ECL); a phase modulator (PM); a polarization maintenance optical coupler (PM-OC); an intensity modulator (IM); a wavelength selective switch (WSS); an electrical amplifier (EA); and a low pass filter (LPF).

Three CW lightwaves with linewidth less than 100 kHz and output power of 14.5 dBm are generated by three external cavity lasers (ECL) at 1547.60 nm ($\lambda 1$), 1547.36 nm ($\lambda 2$), and 1547.12 nm ($\lambda 3$), respectively. For the 100 Gb/s downstream wireline signal, the CW at $\lambda 2$ is modulated via a polarization multiplexing optical I/Q modulator to generate 112-Gb/s PM-QPSK downstream signal.

The I/Q modulator is driven by four sets of 28-Gb/s pseudorandom bit sequence (PRBS) electrical signals with a word length of $2^{15}-1$. Then, the 100-Gb/s PM-QPSK signal passes through one programmable optical WSS (WSS1) with a 30-GHz passing window. The CW lightwave at $\lambda 1$ is modulated via one intensity modulator (IM) driven by 12.5-Gb/s PRBS data with a word length of $2^{31}-1$ to generate regular optical ON/OFF keying (OOK) NRZ optical signals. The CW at $\lambda 3$ is split by using a 3-dB 1×2 polarization maintenance coupler (PM-OC2), one part of the signal is kept as LO for coherent detection of upstream signals, the other part of the signal is combined with 112-Gb/s downstream wireline signal and a 12.5-Gb/s wireless signal via a 4×1 PM-OC (PM-OC1).

The optical spectrum after PM-OC 1 is shown as inset (a) in FIG. 2. The wavelength spacing between $\lambda 1$ and $\lambda 3$ is 0.48 nm (60 GHz), while the spacing between 112-Gb/s wireline signal at $\lambda 1$ and 12.5-Gb/s wireless signal $\lambda 2$ is set to 0.24 nm.

After transmission over 80-km downstream optical fiber (SMF-28), one WSS (WSS2) with one input and two output ports is used to choose the CW at $\lambda 3$ and 12.5-Gb/s wireless data at $\lambda 1$. The optical spectrum after the WSS is shown as inset (b) in FIG. 2, where the frequency spacing between the two signals is 0.48 nm (60 GHz). The transmission distance is not limited to 80 km, and the transmission fiber can be SMF-28, or other fiber.

The 60-GHz electrical mm-wave signals are generated via the detection in a PIN photodiode with the bandwidth of 70 GHz before they are amplified by an electrical narrowband amplifier with 3-dB bandwidth of 10 GHz at the central frequency of 60 GHz. The converted electrical signals are directly down-converted without wireless transmission by using an electrical mixer with self-mixing scheme to retrieve the 12.5-Gb/s OOK signals.

Figure 3:
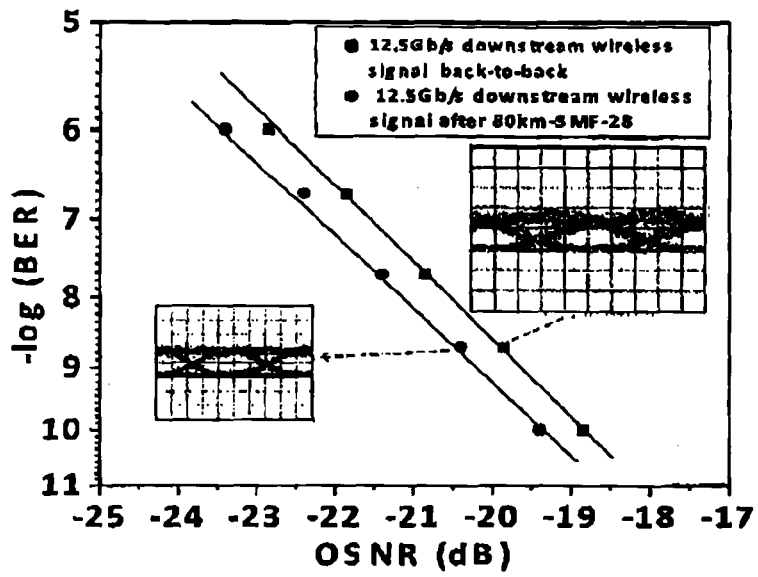
FIG. 3 ((a) 12.5 Gbit/s downstream signal; (b) 112 Gbit/s downstream and upstream wireline signal) illustrates bit-error-ratio (BER) curves from the architecture illustrated in FIG. 2.
Figure 3:
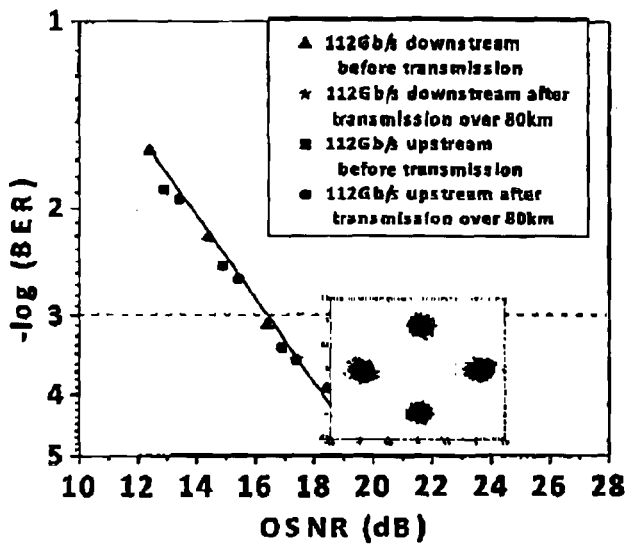

The received eye diagrams of the 12.5-Gb/s OOK signals before and after transmission over 80-km SMF and the corresponding BER performance are shown as FIG. 3(a). The shape change exhibited at the received eye diagram is attributable to fiber dispersion, and the power penalty is smaller than 1 dB.

Another WSS (WSS3) is used to select the CW at λ3 and the 112-Gb/s optical signal λ2. The 112-Gb/s PM-QPSK signal is coherent detected. The CW at λ3 is modulated via another I/Q modulator to carry 112-Gb/s PM-QPSK upstream signal. After transmission over 80-km SMF-28 uplink fiber, the upstream signal is coherent detected with the LO generated from the CW lightwave at λ3.

For coherent detection of downstream and upstream 100-Gb/s PM-QPSK signals, a polarization-diverse 90 degree hybrid is used to realize the polarization and phase-diverse coherent detection of the LO and received optical signal before balance detection. The analog-to-digital conversion (A/D) is realized in the digital scope with 80-Gs/s sample rate and 30-GHz electrical bandwidth. The captured data is processed through offline digital signal processing (DSP).

First, the clock is extracted using a "square and filter" method, the digital signal is re-sampled at twice the baud rate based on the recovery clock. Second, a T/2-spaced time-domain finite impulse response (FIR) filter is utilized for the compensation of chromatic dispersion. Third, for 112-Gb/s PM-QPSK signal, two complex-valued, 13-tap, T/2-spaced adaptive FIR filters, found on classic constant modulus algorithm (CMA), is used to retrieve the modulus of the QPSK signal; carrier recovery is performed in the subsequent step where the 4th power is used to estimate the frequency offset between the LO and the received optical signal, and then the maximum-likelihood (ML) algorithm is utilized to estimate the carrier phase.

FIG. 3(b) shows the BER curve of 112-Gb/s downstream PM-QPSK signals, where the data set for BER calculation consists of 10×65000 symbols. The OSNR requirement at the BER of 1×10E-3 is 16.4 dB at the back-to-back case, after transmission over 80 km, OSNR penalty is negligible. The corresponding constellations for the measured signal after transmission are inserted in FIG. 3(b). The BER performance and corresponding constellation of 112-Gb/s upstream signal are also shown in FIG. 3(b), the OSNR requirement at the BER of 1×10E-3 is 16 dB and the OSNR penalty before and after transmission over 80-km SMF-28 uplink fiber can be neglected.

A super-broadband optical wireless system to provide 12.5-Gb/s wireless and 100-Gb/s symmetrical wireline service for both downstream and upstream link with 80 km long-reach distance is demonstrated. Additionally, novel enabling techniques are used to reduce the cost of the system including free-run CW lasers for optical mm-wave generation and self-mixing down-conversion for stable operation, and sharing the CW source as the LO signal for upstream signal coherent detection and optical mm-wave signal generation. The optical power penalty for 12.5 Gb/s at 60-GHz mm-wave signal after transmission over 80 km is smaller than 1 dB. The OSNR penalty for both downstream and upstream 100-Gb/s wireline signal is negligible.

What is claimed:

1. A method of super-broadband service comprising:
   carrying downstream data using a first continuous wave lightwave of a first wavelength and a second continuous wave lightwave of a second wavelength, wherein the first continuous wave lightwave carries wireless data and the second continuous wave lightwave carries wireline data;
   using a third continuous wave lightwave of a third wavelength for generation of a mm-wave signal and as a local oscillator for coherent detection of an upstream signal;
   reducing, by a first optical filter, cross-talk between the downstream wireline data and one or more signals of the first wavelength and of the third wavelength;
   combining, by a polarization maintaining optical coupler, the first lightwave, the second lightwave, and the third lightwave, resulting in a combined lightwave that is transmitted over a downlink fiber;
   separating, by a second optical filter, the mm-wave signal, the downstream signal of the first wavelength, and a local oscillator of the third wavelength;
   detecting, by a high-speed photodiode, the first continuous wave lightwave of the first wavelength and the second continuous wave lightwave of the second wavelength; and
   amplifying and broadcasting the mm-wave signal.

2. The method of claim 1, wherein the wireline data is PM-QPSK, PM-8PSK, or PM-8QAM, and the downstream wireless data is OOK or OFDM.

3. The method of claim 1, wherein a frequency spacing between the first continuous wave lightwave and the third continuous wave lightwave is approximately 60 GHz and the spacing between the first continuous wave lightwave and the second continuous wave lightwave is approximately 30 GHz.

4. The method of claim 1, further comprising using an optical interleaver after the polarization maintaining optical coupler.

5. The method of claim 4, wherein the optical interleaver optical interleaver is approximately 100 GHz.

6. The method of claim 1, wherein a self-mixing scheme is used to down-convert the broadcasted mm-wave signal.

7. The method of claim 1, further comprising using coherent detection.

8. The method of claim 1, further comprising carrying upstream wireline data using the third continuous wave lightwave of the third wavelength; and
   transmitting the upstream wireline data over an uplink fiber, wherein the upstream wireline data is coherent-detected.

9. The method of claim 8, further comprising using a second local oscillator, wherein the second oscillator comes from a source of the third continuous wave lightwave of the third wavelength.

10. The method of claim 8, wherein the upstream wireline data is PM-QPSK, PM-8PSK, or PM-8QAM.

11. The method of claim 1, wherein the first continuous wave lightwave, the second continuous wave lightwave, and the third continuous wave lightwave are each generated by an external cavity laser.

12. A super-broadband network comprising:
   means for carrying downstream data using a first continuous wave lightwave of a first wavelength and a second continuous wave lightwave of a second wavelength, wherein the first continuous wave lightwave carries wireless data and the second continuous wave lightwave carries wireline data;
   means for using a third continuous wave lightwave of a third wavelength for generation of a mm-wave signal and as a local oscillator for coherent detection of an upstream signal;

means for reducing cross-talk between the downstream wireline data and one or more signals of the first wavelength and of the third wavelength;

means for combining the first lightwave, the second lightwave, and the third lightwave, resulting in a combined lightwave that is transmitted over a downlink fiber;

means for separating the mm-wave signal, the downstream signal of the first wavelength, and a local oscillator of the third wavelength;

means for detecting the first continuous wave lightwave of the first wavelength and the second continuous wave lightwave of the second wavelength; and means for amplifying and broadcasting the mm-wave signal.

13. The network of claim 12, wherein the wireline data is PM-QPSK, PM-8PSK, or PM-8QAM, and the downstream wireless data is OOK or OFDM.

14. The network of claim 12, wherein a frequency spacing between the first continuous wave lightwave and the third continuous wave lightwave is approximately 60 GHz and the spacing between the first continuous wave lightwave and the second continuous wave lightwave is approximately 30 GHz.

15. The network of claim 12, further comprising an optical interleaver for use after the polarization maintaining optical coupler.

16. The network of claim 15, wherein the optical interleaver optical interleaver is approximately 100 GHz.

17. The network of claim 12, wherein a self-mixing scheme is used to down-convert the broadcasted mm-wave signal.

18. The network of claim 12, further comprising means for coherent detection.

19. The network of claim 12, further comprising means for carrying upstream wireline data using the third continuous wave lightwave of the third wavelength; and means for transmitting the upstream wireline data over an uplink fiber, wherein the upstream wireline data is coherent-detected.

20. The network of claim 19, further comprising a second local oscillator, wherein the second oscillator comes from a source of the third continuous wave lightwave of the third wavelength.

21. The network of claim 19, wherein the upstream wireline data is PM-QPSK, PM-8PSK, or PM-8QAM.

22. The network of claim 12, wherein the first continuous wave lightwave, the second continuous wave lightwave, and the third continuous wave lightwave are each generated by an external cavity laser.

23. A super-broadband network comprising:

external cavity lasers for generating (i) a first continuous wave lightwave of a first wavelength and a second continuous wave lightwave of a second wavelength, wherein the first continuous wave lightwave carries wireless data and the second continuous wave lightwave carries wireline data, and (2) a third continuous wave lightwave of a third wavelength, wherein the third continuous wave lightwave is used for generation of a mm-wave signal and as a local oscillator for coherent detection of an upstream signal;

a first optical filter for reducing cross-talk between the downstream wireline data and one or more signals of the first wavelength and of the third wavelength;

a polarization maintaining optical coupler for combining the first lightwave, the second lightwave, and the third lightwave, resulting in a combined lightwave for transmission over a downlink fiber;

a second optical filter for separating the mm-wave signal, the downstream signal of the first wavelength, and a local oscillator of the third wavelength;

a high-speed photodiode for detecting the first continuous wave lightwave of the first wavelength and the second continuous wave lightwave of the second wavelength; and a transmitter for broadcasting the mm-wave signal.

24. The network of claim 23, wherein the wireline data is PM-QPSK, PM-8PSK, or PM-8QAM, and the downstream wireless data is OOK or OFDM.

25. The method of claim 23, wherein a frequency spacing between the first continuous wave lightwave and the third continuous wave lightwave is approximately 60 GHz and the spacing between the first continuous wave lightwave and the second continuous wave lightwave is approximately 30 GHz.

26. The network of claim 23, further comprising an optical interleaver after the polarization maintaining optical coupler.

27. The network of claim 26, wherein the optical interleaver optical interleaver is approximately 100 GHz.

28. The network of claim 23, wherein a self-mixing scheme is used to down-convert the broadcasted mm-wave signal.

29. The network of claim 23, further comprising means for coherent detection.

30. The network of claim 23, further comprising an uplink fiber for carrying upstream wireline data using the third continuous wave lightwave of the third wavelength.

31. The network of claim 30, further comprising a second local oscillator, wherein the second oscillator comes from a source of the third continuous wave lightwave of the third wavelength.

32. The network of claim 23, wherein the upstream wireline data is PM-QPSK.

* * * * *